United States Patent [19]

Trocciola et al.

[11] 4,317,865
[45] Mar. 2, 1982

[54] CERIA MATRIX MATERIAL FOR MOLTEN CARBONATE FUEL CELL

[75] Inventors: John C. Trocciola, Glastonbury; Craig R. Schroll, West Hartford; Raymond W. Vine, Avon, all of Conn.

[73] Assignee: United Technologies Corporation, Hartford, Conn.

[21] Appl. No.: 189,886

[22] Filed: Sep. 24, 1980

[51] Int. Cl.³ .............................................. H01M 8/14
[52] U.S. Cl. ........................................ 429/41; 429/44; 429/16
[58] Field of Search ...................... 429/41, 44, 46, 30, 429/33, 16, 193

[56] References Cited

U.S. PATENT DOCUMENTS

| | | | |
|---|---|---|---|
| 3,377,203 | 4/1968 | Mobius et al. | 429/33 |
| 3,466,197 | 9/1969 | Bawa | 429/46 |
| 3,467,552 | 9/1969 | Giner | 429/41 |
| 3,615,839 | 10/1971 | Thompson et al. | 429/16 |
| 3,622,394 | 11/1971 | Bawa et al. | 429/102 X |
| 3,658,597 | 4/1972 | Gray | 75/206 |
| 3,998,939 | 12/1976 | Mason et al. | 423/600 |
| 4,041,210 | 8/1977 | Van Dike | 429/16 |
| 4,079,171 | 3/1978 | Marianowski et al. | 429/46 |
| 4,080,487 | 3/1978 | Reiser | 429/16 |

FOREIGN PATENT DOCUMENTS 893853 2/1972 Canada .

OTHER PUBLICATIONS

Broers, G. H. J., *High Temperature Galvanic Fuel Cells*, Academisch Proefschrift, (1958).
Broers, G. H. J. and Van Ballegoy, H. J. J., "Phase Equilibria in Li–Na–K Carbonate/Aluminate Systems", Paper presented at the 3rd International Symposium on Fuel Cells, Brussels, Jun. 1969.
Huynink, H. E., "Cell Assemblies for a Molten Carbonate Fuel Battery, II, Electrolyte Plate Discs for Molten Carbonate Fuel Cells", *Energy Convers.* 12, 139–143, (1972).
Tuller et al., "Doped Ceria as a Solid Oxide Electrolyte", *J. Electrochem. Soc.*, vol. 122, No. 2, pp. 255–259, 1975.

*Primary Examiner*—Anthony Skapars
*Attorney, Agent, or Firm*—Harry J. Gwinnell

[57] ABSTRACT

A molten carbonate fuel cell electrolyte-matrix material and a molten carbonate fuel cell including such material are described. The electrolyte-matrix material comprises carbonate electrolytes in intimate combination with ceria matrix material. The electrolyte-matrix material shows substantially no phase change or reaction with the electrolyte after at least 2000 hours under molten carbonate fuel cell operating conditions.

8 Claims, 1 Drawing Figure

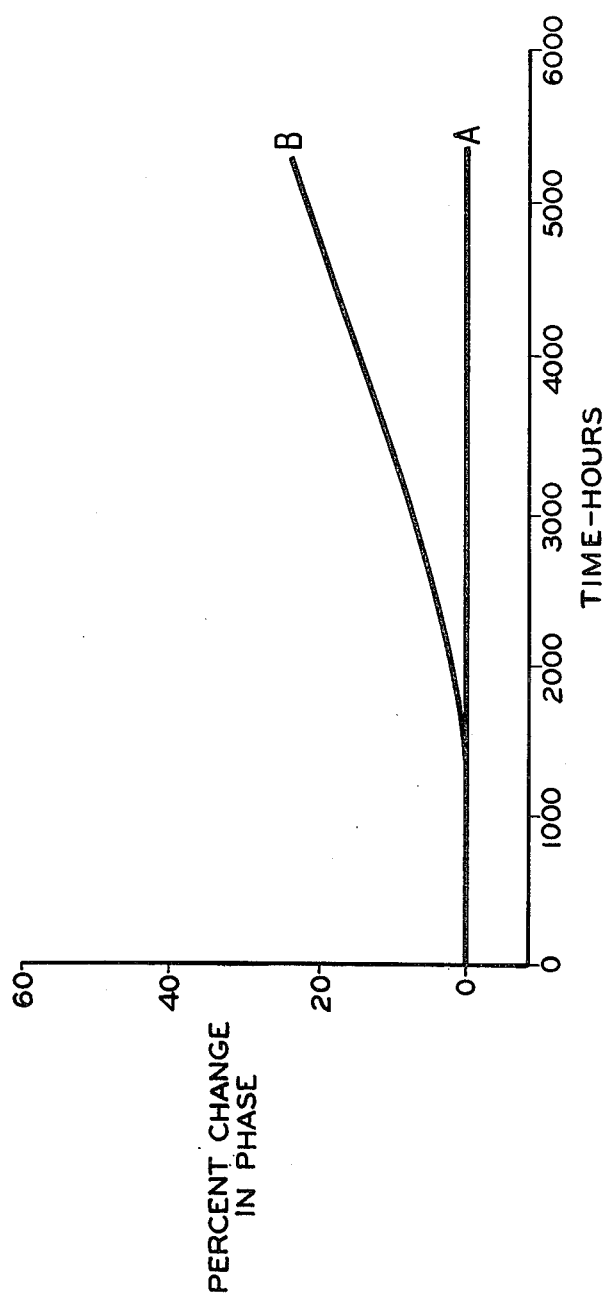

CERIA MATRIX MATERIAL FOR MOLTEN CARBONATE FUEL CELL

CROSS REFERENCE TO RELATED APPLICATIONS

Commonly assigned, copending application Ser. No. 189,887, filed Sept. 24, 1981 is directed to a molten carbonate fuel cell anode; and commonly assigned, copending application Ser. No. 189,888, filed Sept. 24, 1980 is directed to an anode-matrix composite for molten carbonate fuel cells.

DESCRIPTION

1. Technical Field

The field of art to which this invention pertains is molten carbonate fuel cells and more particularly electrolyte-matrix material for molten carbonate fuel cells.

2. Background Art

Fuel cells which use alkali-metal carbonates as the electrolyte are well known in the art and are generally referred to as molten carbonate fuel cells since the electrolyte is liquid at typical operating temperatures in the range of 550° C.-750° C. (1022° F.-1382° F.). The electrolyte is usually mixed with an inert particulate or fibrous material commonly referred to as a matrix or filler which remains solid during cell operation and maintains the space between the cathode and anode portions of the cell and in combination with the electrolyte prevents the mixing of the two reactants. The combination of electrolyte and inert material is frequently referred to as a tile when in the solid state at room temperature. Most molten carbonate fuel cell electrolytes are ternary or binary mixtures of, for example, lithium carbonate, potassium carbonate, and sodium carbonate. Molten carbonate fuel cell systems in general are described in commonly owned U. S. Pat. Nos. 3,615,839; 4,041,210; and 4,080,487.

Because of the highly corrosive environment which exists in fuel cells in general, there is an on-going search for stable electrolyte-matrix material which can withstand the rigors of such use. For example, Canadian Patent 893,853 discusses the advantages of various metal oxides in corrosive fuel cell environments and particularly demonstrates th advantage of oxides such as ceria in a potassium hydroxide electrolyte solution operated under pressure at 250° C. Similarly, U.S. Pat. No. 3,622,394 teaches the advantages of using magnesium oxide, magnesium aluminate, and lithium aluminate as matrix material.

While it is known in the art, as evidenced by the Canadian reference that such things as zirconium oxide, thorium oxide, cerium oxide, and aluminum oxide have good corrosion stability in molten alkali hydroxides or aqueous strong acids and alkalis, there is no way to predict from this that any particular metal oxide would have exceptional or even acceptable performance in a molten carbonate fuel cell environment. For example, zirconium oxide is well known to be stable in potassium hydroxide. However, its use is unacceptable in a molten carbonate fuel cell. See the Institute of Gas Technology article, "Development of Molten Carbonate Fuel Cells", A.G.A. Project DC-4-1 Final Report, Chicago 1967; and the Huynink, H. E. article, "Cell Assemblies for a Molten Carbonate Fuel Battery. II. Electrolyte Plate Discs for Molten Carbonate Fuel Cells", Energy Convers. 12, 139-143 (1972).

An article by Broers (High Temperature Galvanic Fuel Cells, Broers, G.H.I.) discusses the use of $CeO_2$ in a fuel cell but recognizes no superiority as compared to other materials such as MgO in this environment, and in fact, references some dissolution of the $CeO_2$. Furthermore, the MgO which is reported to be stable in alkaline carbonate systems, in fact demonstrates such problems as matrix cracking, structural degradation and reactivity with the electrolyte in a molten carbonate system. See the Broers, G. H. J. and Van Ballegoy, H. J. J. article entitled "Phase Equilibria in Li-Na-K Carbonate/Aluminate Systems", Paper presented at the 3rd International Symposium on Fuel Cells, Brussels, June 1969, Aubry, J. and Klein, F. article entitled "Etude de l'aluminate de lithium", Chim Ind. Genie Chim. 103 (13), 1643-1644 (1970); and Huynink, H. E. article entitled "Cell Assemblies for a Molten Carbonate Fuel Battery. II. Electrolyte Plate Discs for Molten Carbonate Fuel Cells", Energy Convers. 12, 139-143 (1972).

A popular conventional molten carbonate electrolyte-matrix material currently in use is high purity lithium aluminate. Note U.S. Pat. Nos. 3,622,394 and 4,079,171. However, such material is not stable with long term use. Note the FIG. which shows that significant phase change in crystal structure occurs after about 1800 hours in a molten carbonate fuel cell operating environment.

Phase change in crystalline structure or a chemical reaction with the electrolyte is intolerable for an electrolyte-matrix material in a fuel cell. A change in the crystalline size of the particles affects the pore size of the matrix. Either particle growth or particle size shrinkage without compaction will produce large pore sizes in the matrix which will result in electrolyte expulsion to the porous fuel cell electrodes. This results in gas cross-over which enables the gases to chemically react in an uncontrolled manner obviating the liberation and use of electrons from such reactions to produce the current. Similarly, if the filler or matrix chemically reacts with the electrolyte, there is a corresponding depletion of the electrolyte in the matrix and cell. Either case would result in a loss of efficiency of the cell and a reduction in power generation evidenced by a fall-off in the amps produced at a given potential. This same sequence can occur with crystal conversion when the new crystalline form is larger. If the new crystalline form is larger, proportionally too much filler will be present between the electrodes causing electrolyte expulsion into the electrodes and carbonate flooding of the electrodes by filling of the pores on the electrodes, thereby preventing the gaseous reactants from getting to the electrode reaction sites.

Though great strides have been made in the discovery of various matrix material for use in corrosive fuel cell environments, there is much room for improvement in matrix material for the long term use desired in this art. Furthermore, it is important to keep in mind that molten carbonate electrolytes provide a completely different type of chemical, thermal and corrosive environment than any other type of fuel cell environment. In particular, the reactions being catalyzed and the corrosive environment produced under molten carbonate fuel cell operating conditions are totally different than produced in other fuel cell environments.

DISCLOSURE OF INVENTION

This invention is directed to an electrolyte-matrix material for a molten carbonate fuel cell comprising an intimate combination of a carbonate electrolyte and a ceria matrix material which exhibits stability and corrosion resistance evidenced by substantially no phase change in crystalline structure or reaction with the electrolyte for at least 2000 hours under molten carbonate fuel cell operating conditions.

Another aspect of the invention is an intimate combination of a carbonate electrolyte and a ceria matrix material which exhibits stability and corrosion resistance evidenced by substantially no phase change in crystalline structure or reaction with the electrolyte for at least 5000 hours under molten carbonate fuel cell operating conditions.

Another aspect of the invention is a molten carbonate fuel cell incorporating such electrolyte-matrix material.

The foregoing, and other features and advantages of the present invention, will become more apparent from the following description and accompanying drawing.

BRIEF DESCRIPTION OF THE DRAWING

The FIGURE shows the deterioration of conventional electrolyte-matrix material with long term use.

BEST MODE FOR CARRYING OUT THE INVENTION

A variety of methods may be utilized to make the electrolyte-matrix according to the present invention. The preferred method comprises coating either the anode or the cathode or both on one side with a solution of the ceria admixed with a temporary binder, such as gum arabic, cellulose acetate or polyvinyl butyral, followed by heating to remove the solvent carrier and binder. If the above binders are used, the heating can take place once the coated electrodes are mounted in the cell. In addition, the electrolyte can provide part of the admixture resulting in an electrolyte-matrix-binder coating, or the electrodes may be soaked in the electrolyte and the electrolyte allowed to infiltrate the matrix during cell heat-up.

Other methods which may be used to form the electrolyte-matrix of the present invention comprise compression molding ceria particles in combination or admixture with the electrolyte; or using the ceria alone by either drypressing, tape forming or slip casting using a temporary binder, or by sintering the ceria to form a porous substrate which is subsequently impregnated with the electrolyte in either solution or molten form. While tiles made according to such methods can be of any size depending on fuel cell design, the tiles made and tested were typically made in four-inch squares with a thickness of approximately 50-70 mil.

While conventional binder material known in the art can be used in the fabrication of the ceria matrix, it is preferred to use a binder which can be removed by heating after the cell is constructed. Binders such as described above, or the carbonate electrolyte itself are particularly suitable for such a process. It should also be noted that it is not necessary for the ceria particles to be permanently bonded. For example, the ceria and electrolyte can simply be admixed in dry particulate form and poured or otherwise inserted between the electrodes. As stated, the electrolyte can be in dry particulate form as an admixture with the ceria particles or the ceria particles can be inserted unmixed between the electrodes and the carbonate electrolyte added separately. In such a case, the electrolyte can be added in molten or solution form or as described above, the electrodes can be pre-filled with electrolyte and the electrolyte allowed to soak into the matrix during cell heat-up.

The ceria used according to the present invention is preferably of the highest grade available, e.g. 99% by weight pure or better. However, a lower grade, such as 90%-95% purity ceria can also be used. Tolerable impurities comprise such things as other rare earth oxides, such as $Y_2O_3$, etc. Use of the term "ceria" throughout the specification and claims is meant to include the well-known $CeO_2$ form as well as reduced forms such as $Ce_2O_3$ or $CeO_{2-x}$ wherein x can vary between 0 and 0.5. The ceria matrix material is preferably used in the electrolyte matrix in about 20 to about 70% by volume with the remainder being electrolyte.

The preferred molten carbonate electrolyte comprises a eutectic mixture of lithium carbonate and potassium carbonate. However, any molten carbonate electrolyte system may be used such as, but not limited to, alkali metal or alkali earth carbonates, conventional lithium carbonate, potassium carbonate, sodium carbonate or combinations thereof.

Stability of the electrolyte matrix material of the present invention was measured in tests which allowed the maximum available carbonate electrolyte to contact the ceria particles. The ceria particles were immersed and surrounded by molten carbonate electrolyte heated to at least 1200° F. In one case the fuel gas environment was simulated by allowing a mixture comprising approximately 51% $H_2$, 10% $CO_2$, 10% CO and 29% $H_2O$, all percents by volume, to pass over the ceria-carbonate on a continuing basis. In other tests the oxidant environment was simulated by utilizing a $CO_2$ gas at temperatures up to 1400° F. in the same manner. These tests not only simulate the fuel cell environment, but simulate this environment with maximum ceria exposure to the carbonate. The carbonate electrolyte used was a preferred binary eutectic mixture of 62% by volume lithium carbonate and 38% by volume potassium carbonate. As evidenced by the Figure showing the fuel gas environment testing described above, where curve A is the ceria matrix material and B conventional high purity γ $LiAlO_2$ matrix material, not only was there no sign of corrosion, crystalline phase change, or reactivity of the ceria with the molten carbonate after 2000 hours of testing, but no signs of instability were evident even after more than 5000 hours of testing. The $LiAlO_2$, however, began to show significant crystalline phase change after 1800 hours. The ceria remained in its original cubic phase with substantially no change in mechanical strength or weight loss during the test duration. The lithium aluminate tested as described above at 1375° F. under $CO_2$ gas flow showed essentially 100% crystalline phase change after only 1100 hours. The ceria tested under the same conditions (1375° F., $CO_2$ gas flow) showed no crystalline phase change after 2000 hours of testing.

It is quite unexpected that the ceria performs in such manner in the molten carbonate environment since as stated above, other ceramics such as zirconium oxide and potassium titanate which are compatible (as is ceria) with molten KOH under KOH fuel cell operating conditions are incompatible with molten carbonate under molten carbonate fuel cell operating conditions. For example, zirconia under the same test conditions recited above for ceria, reacts with at least one of the carbonate electrolytes according to the following equation:

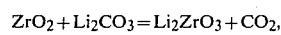

$$ZrO_2 + Li_2CO_3 = Li_2ZrO_3 + CO_2,$$

with a corresponding change in volume. Furthermore, ceria being the first element of the rare earths in the Periodic Table, is similar to 15 other elements in this series. Yet, lanthanum oxide, which is the nearest neighbor to ceria in the rare earth series, is not compatible with molten carbonate under fuel cell operating conditions. Test results show that lanthanum oxide forms lanthanum carbonate very quickly, e.g. after 390 hours at 1400° F. under $CO_2$ gas flow in the presence of carbonate as described above. Therefore, it might be expected that ceria would also react in the same way. However, as evidenced above, not only does ceria not react in such a way, but the ceria is far superior to any known matrix material in this environment.

Although this invention has been shown and described with respect to detailed embodiments thereof, it will be understood by those skilled in the art that various changes in form and detail thereof may be made without departing from the spirit and scope of the claimed invention.

We claim:

1. A molten carbonate fuel cell electrolyte-matrix material consisting essentially of alkali metal carbonate electrolyte in intimate combination with ceria matrix material which undergoes substantially no crystalline phase change or reaction with electrolyte for at least 2000 hours under molten carbonate fuel cell operating conditions.

2. The material of claim 1 wherein the ceria is present in an amount of about 20 to about 70% by volume.

3. The material of claim 1 wherein the carbonate electrolyte comprises lithium carbonate, potassium carbonate, sodium carbonate or mixtures thereof.

4. The material of claim 1 wherein the ceria matrix material undergoes substantially no crystalline phase change or reaction with electrolyte for at least 5000 hours under molten carbonate fuel cell operating conditions.

5. A fuel cell including an electrolyte-matrix containing an alkali metal carbonate electrolyte which is molten during operation of the fuel cell, and anode electrode in contact with the electrolyte-matrix and a cathode electrode spaced apart from the anode electrode and in contact with the electrolyte-matrix, wherein the improvement comprises using as the electrolyte-matrix an alkali metal carbonate electrolyte in intimate combination with ceria matrix material which undergoes substantially no crystalline phase change or reaction with electrolyte for at least 2000 hours under molten carbonate fuel cell operating conditions.

6. The fuel cell of claim 5 wherein the electrolyte-matrix comprises about 20% to about 70% by volume ceria.

7. The fuel cell of claim 5 wherein the carbonate electrolyte comprises lithium carbonate, potassium carbonate, sodium carbonate or mixtures thereof.

8. The fuel cell of claim 5 wherein the ceria matrix material undergoes substantially no crystalline phase change or reaction with electrolyte for at least 5000 hours under molten carbonate fuel cell operating conditions.

* * * * *